US008457670B2

(12) United States Patent
Levi et al.

(10) Patent No.: US 8,457,670 B2
(45) Date of Patent: *Jun. 4, 2013

(54) SYSTEM AND METHOD FOR PEER-TO-PEER ADVERTISING BETWEEN MOBILE COMMUNICATION DEVICES

(75) Inventors: Andrew E. Levi, Plano, TX (US); Bradley W. Bauer, Richardson, TX (US)

(73) Assignee: Blue Calypso, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,048

(22) Filed: Mar. 16, 2012

(65) Prior Publication Data

US 2012/0246006 A1    Sep. 27, 2012

Related U.S. Application Data

(63) Continuation of application No. 12/592,019, filed on Nov. 18, 2009, now Pat. No. 8,155,679, which is a continuation of application No. 11/318,144, filed on Dec. 23, 2005, now Pat. No. 7,664,516.

(60) Provisional application No. 60/639,267, filed on Dec. 27, 2004.

(51) Int. Cl.
*H04W 4/00* (2009.01)

(52) U.S. Cl.
USPC ........ 455/466; 705/7.14; 705/7.38; 705/7.15; 705/14.1; 705/14.4; 725/42; 455/414.1; 455/432.1

(58) Field of Classification Search
USPC ................ 705/14.4–14.46, 14.72, 7.14, 7.15, 705/7.22, 738, 14.1, 26.1; 455/466, 414.1, 455/432.1; 725/42
See application file for complete search history.

(56) References Cited

U.S. PATENT DOCUMENTS 4,850,007 A    7/1989    Marino et al.
5,333,186 A    7/1994    Gupta (Continued)

FOREIGN PATENT DOCUMENTS

JP    2001256388    9/2001
JP    2007219840    8/2007

(Continued)

OTHER PUBLICATIONS

Gao, J Kulkarni, V Ranavat, H Lee Chang Hsing Mei; A 2D Barcode-Based Mobile Payment System; Multimedia and Ubiquitous Engineering, 2009. MUE '09; Jun. 4-6, 2009; pp. 320-329.

(Continued)

*Primary Examiner* — Anthony Addy
*Assistant Examiner* — Quan M Hua
(74) *Attorney, Agent, or Firm* — Schultz & Associates, P.C.

(57) ABSTRACT

Disclosed are a method and system for peer-to-peer advertising between mobile communication devices. A subsidy program is set up based on a profile of an advertiser having at least one advertising media. A qualified subscriber is identified for the advertiser based on a profile of a subscriber. One or more advertisers and subsidy programs for the qualified subscriber is selected. In addition, when a communication transmission is received from a source communication device, at least one advertising media is associated with the communication transmission and the communication transmission is transmitted from a source communication device to a destination communication device.

5 Claims, 9 Drawing Sheets

U.S. PATENT DOCUMENTS

| | | | |
|---|---|---|---|
| 5,448,625 | A | 9/1995 | Lederman |
| 5,852,775 | A | 12/1998 | Hidary |
| 5,937,037 | A | 8/1999 | Kamel et al. |
| 6,009,150 | A | 12/1999 | Kamel |
| 6,084,628 | A | 7/2000 | Sawyer |
| 6,181,927 | B1 | 1/2001 | Welling, Jr. et al. |
| 6,324,519 | B1 | 11/2001 | Elderling |
| 6,442,529 | B1 | 8/2002 | Krishan et al. |
| 6,493,437 | B1 | 12/2002 | Olshansky |
| 6,647,257 | B2 | 11/2003 | Owensby |
| 7,184,972 | B2 | 2/2007 | Flaherty |
| 7,197,544 | B2 | 3/2007 | Wang et al. |
| 7,240,843 | B2 | 7/2007 | Paul |
| 7,389,118 | B2 | 6/2008 | Vesikivi et al. |
| 7,599,852 | B2 | 10/2009 | Bosarge et al. |
| 7,664,516 | B2 | 2/2010 | Levi et al. |
| 8,155,679 | B2 * | 4/2012 | Levi et al. ............ 455/466 |
| 2001/0047294 | A1 | 11/2001 | Rothschild |
| 2002/0071076 | A1 | 6/2002 | Webb |
| 2002/0072967 | A1 | 6/2002 | Jacobs et al. |
| 2002/0077988 | A1 | 6/2002 | Saski et al. |
| 2002/0091569 | A1 | 7/2002 | Kitaura |
| 2002/0094868 | A1 | 7/2002 | Tuck et al. |
| 2002/0160761 | A1 | 10/2002 | Wolfe |
| 2002/0198777 | A1 | 12/2002 | Yuasa |
| 2003/0032409 | A1 | 2/2003 | Hutcheson et al. |
| 2003/0144035 | A1 | 7/2003 | Weinblatt |
| 2003/0158776 | A1 | 8/2003 | Landesmann |
| 2003/0172376 | A1 | 9/2003 | Coffin, III |
| 2003/0177347 | A1 | 9/2003 | Schneier |
| 2003/0233276 | A1 | 12/2003 | Pearlman |
| 2004/0103023 | A1 | 5/2004 | Irwin |
| 2004/0148424 | A1 | 7/2004 | Berkson et al. |
| 2004/0177003 | A1 | 9/2004 | Liao |
| 2005/0044483 | A1 | 2/2005 | Maze et al. |
| 2005/0055409 | A1 * | 3/2005 | Alsarraf et al. ............ 709/206 |
| 2006/0041469 | A1 | 2/2006 | Mathis |
| 2006/0041477 | A1 * | 2/2006 | Zheng ............ 705/14 |
| 2006/0080111 | A1 | 4/2006 | Homeier Beals |
| 2006/0111967 | A1 | 5/2006 | Forbes |
| 2007/0192182 | A1 | 8/2007 | Monaco |
| 2007/0203792 | A1 | 8/2007 | Rao |
| 2007/0241189 | A1 | 10/2007 | Slavin |
| 2007/0244750 | A1 | 10/2007 | Grannan et al. |
| 2007/0271139 | A1 | 11/2007 | Fiorini |
| 2007/0281692 | A1 | 12/2007 | Bucher |
| 2007/0290031 | A1 | 12/2007 | Singh |
| 2008/0133366 | A1 | 6/2008 | Evans |
| 2008/0133678 | A1 | 6/2008 | Woodham et al. |
| 2008/0172285 | A1 | 7/2008 | Hurowitz |
| 2008/0183587 | A1 | 7/2008 | Joo et al. |
| 2008/0263584 | A1 | 10/2008 | Salo et al. |
| 2008/0287150 | A1 | 11/2008 | Jiang et al. |
| 2009/0030774 | A1 | 1/2009 | Rothschild et al. |
| 2009/0099929 | A1 | 4/2009 | Thibedeau |
| 2009/0106368 | A1 | 4/2009 | Padveen et al. |
| 2009/0204901 | A1 | 8/2009 | Dharmaji et al. |
| 2009/0287574 | A1 | 11/2009 | Kane |

FOREIGN PATENT DOCUMENTS

| | | |
|---|---|---|
| KR | 2006028602 | 3/2006 |
| WO | 9624213 | 8/1996 |
| WO | 0041121 | 7/2000 |
| WO | WO 2001/011472 | 2/2001 |
| WO | 0116853 | 3/2001 |
| WO | 2007139348 | 12/2007 |
| WO | 2009148338 | 12/2009 |

OTHER PUBLICATIONS

Aigner, Manfred Dominikus, Sandra Feldhofer, Martin; A System of Secure Virtual Coupons Using NFC Technology; PerCom Workshops '07. Mar. 19-23, 2007; pp. 362-366.

Gao, Jagatesan; Understanding 2D-BarCode Tech and Appls in M-Commerce-Design and Implementation of a 2D Barcode Processing Solution; COMPSAC 2007; Jul. 24-27, 2007; pp. 49-56.

Kato, H. Tan, K.T.; 2D barcodes for mobile phones; Mobile Technology, Applications and Systems, 2005 2nd International Conference on; Nov. 15-17, 2005; p. 8.

Koung-Lung Lin Hsu, J.Y.-J. Han-Shen Huang Chun-Nan Hsu; A recommender for targeted advertisement of unsought products in e-commerce; CEC 2005; Jul. 19-22, 2005; pp. 101-108.

\* cited by examiner

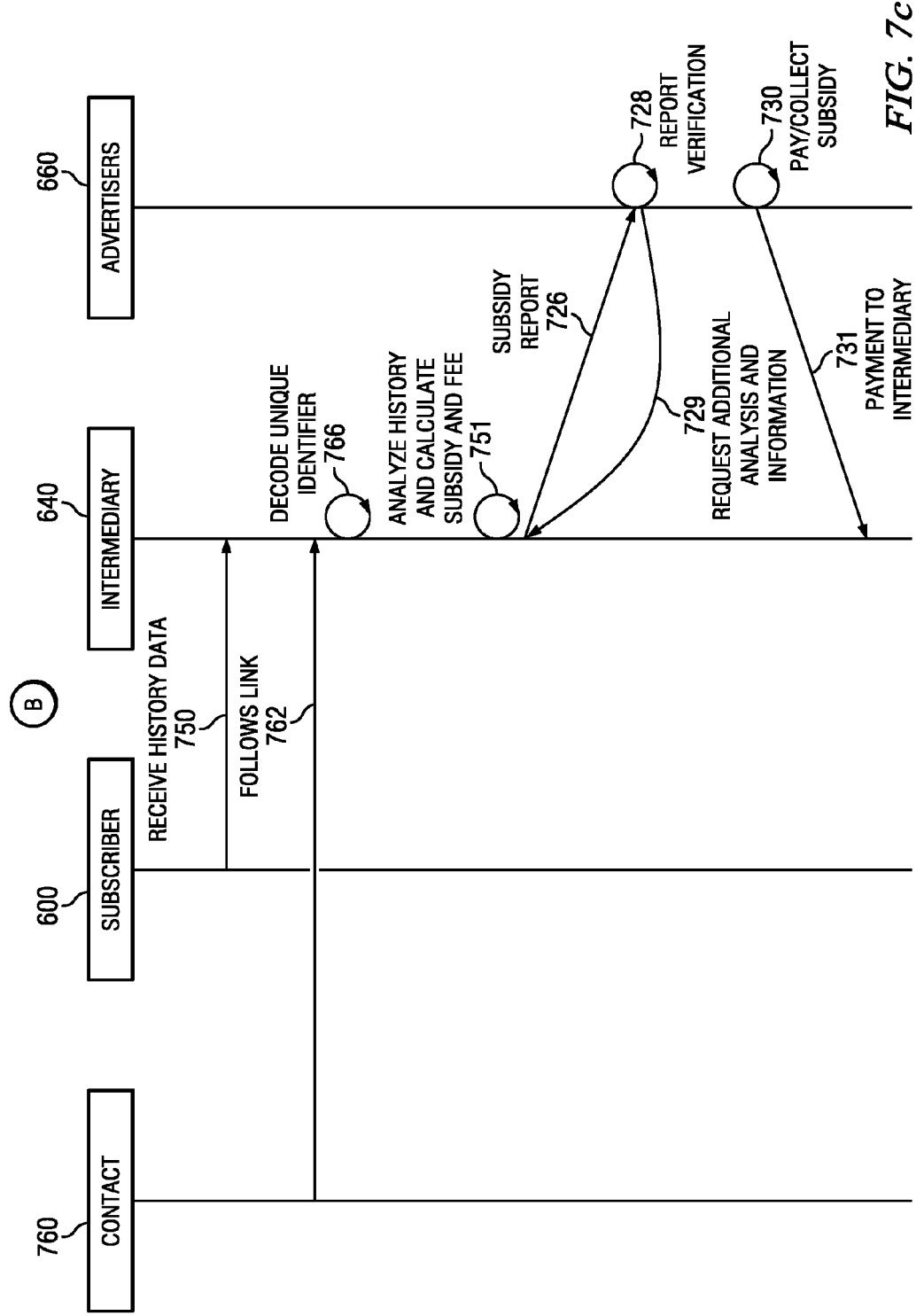

SYSTEM AND METHOD FOR PEER-TO-PEER ADVERTISING BETWEEN MOBILE COMMUNICATION DEVICES

CROSS-REFERENCE TO RELATED APPLICATIONS

This application is a continuation application claiming priority from U.S. patent application Ser. No. 12/592,019 filed on Nov. 18, 2009 which is a continuation of U.S. Pat. No. 7,664,516 filed on Dec. 23, 2005 which claims priority to U.S. Provisional Patent Application No. 60/639,267 filed Dec. 27, 2004.

BACKGROUND OF THE INVENTION

As peer-to-peer and mobile technologies evolve into highly sophisticated two-way communication systems including mobile phones, instant messaging devices, and personal digital assistants (PDA), the adoption and usage of such technologies continue to increase at a rapid rate. Advertisers are highly motivated to identify new methods of creating brand awareness to users. One of these methods is known as advertising impressions. Leveraging mobile technologies as described above, advertising impressions provide brand and product awareness by directly displaying company advertisements, offering sale promotions, or facilitating the sale of products directly to users' devices.

In addition to advertisers, users may utilize these technologies to select specific advertisers who may reach them. For example, technologies like personal digital video recorders allow users to skip undesirable advertisements. In addition, technologies, such as a subscription of satellite radio, allow users to listen to music without the disruption of commercials.

With the declining ability to offer advertisements through traditional broadcast advertising medium, such as public radio and television, a need exists for a method that offers more frequent and effective direct advertising to peer-to-peer users.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 7c describes the payment of the subsidy to the subscriber.

DETAILED DESCRIPTION

Figure 1:
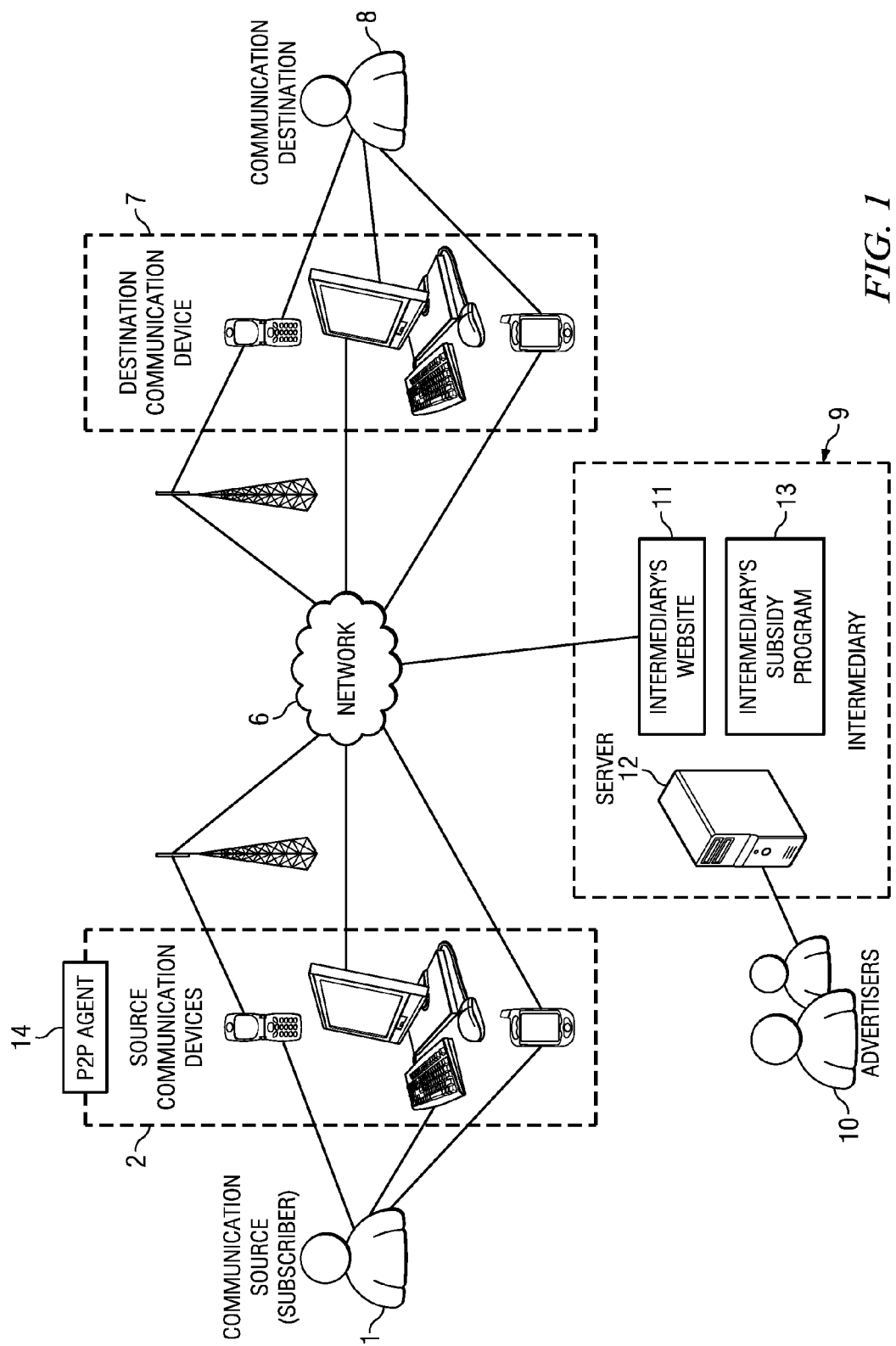
FIG. 1 is a diagram of exemplary components for providing advertising between peer-to-peer communication devices.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Aspects of the present disclosure provide effective transmissions of advertisements preceding and following transmissions of peer-to-peer communications, which occur directly between peer-to-peer communication devices. Examples of peer-to-peer communication devices include cellular phones, personal digital assistants (PDA), personal computers, instant messaging devices, and audio devices.

FIG. 1 is a diagram of exemplary components for providing direct advertising between peer-to-peer communication devices. A communication source, such as subscriber 1, subscribes to a communication subsidy program 13 of an intermediary 9. In an illustrative embodiment, the communication subsidy program 13 of the intermediary 9 is funded in whole or in part by advertisers 10. Alternatively, the communication subsidy program 13 of the intermediary 9 may be funded by an independent entity, an Internet service provider, or a telecommunications service provider. The intermediary communication subsidy program 13 may be developed using an object-oriented programming language, such as Java™ or C++, C#, or other programming languages.

When a communication transmission (a cellular phone call, a video conferencing session, an instant message, text message (SMS, MMS or other), a personal computer communication, or a voice communication) is initiated by the subscriber 1 to a communication destination 8, an advertisement preceding and/or following the communication is transmitted to a destination communications device 7 used by communication destination 8. The subscriber 1 may utilize a source communication device 2, such as a cellular phone, a personal computer, a personal digital assistant, or an instant messaging device, to initiate the communication. Source communication device 2 may be coupled to a network 6 and may communicate with destination communication device 7 via the network 6 using a communications protocol. Examples of network 6 may be the Internet, a private network, a cellular phone network, or other service provider networks. Examples of the communication protocol include Transmission Control Protocol/Internet Protocol (TCP/IP), Global System for Mobile Communications (GSM), Code Division Multiple Access (CDMA), and Wireless Application Protocol (WAP).

Operating systems running on communication devices 2 and 7 coordinate and provide control of various components. Each operating system may be a commercially available operating system such as Microsoft® Windows® Mobile (Microsoft and Windows are trademarks of Microsoft Corporation, Redmond, Wash.). An object-oriented software system, such as the Java™ software system may run in conjunction with the operating system and provide calls to the operating system from Java™ programs or applications executing on communication devices 2 and 7. (Java is a product available from Sun Microsystems, Inc, of Santa Clara, Calif.) It is understood that the present disclosure may be used with other operating systems and applications written using other programming languages.

When the communication transmission is received by destination communication device 7, the advertisement may be displayed, played, or confirmed. The source of the advertisement may be announced to the recipient as being endorsed by the advertisers 10, an independent entity, an Internet service provider, a telecommunication service provider, or other types of communication providers. It is understood that FIG. 1 is intended as an example, and not as an architectural limitation for different embodiments of the present disclosure.

Figure 2:
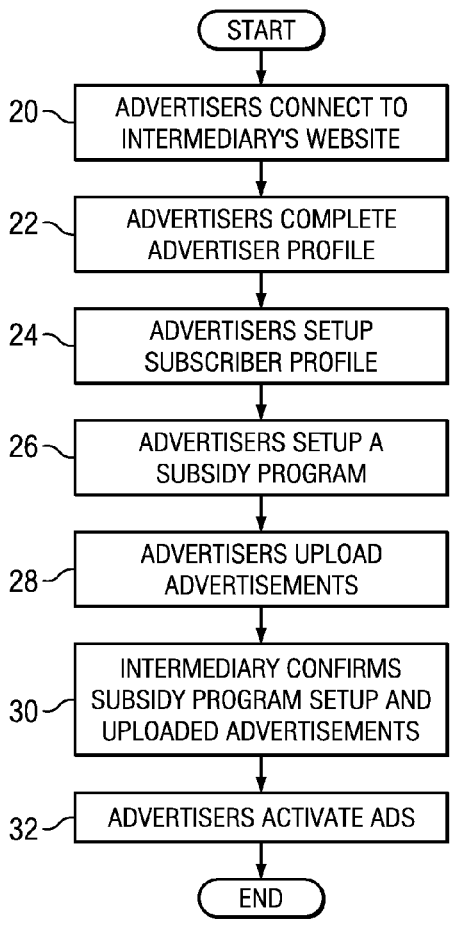
FIG. 2 a flowchart of an embodiment of an advertiser setup process.

FIG. 2 is a flowchart of an embodiment of an advertiser setup process. Advertisers 10 may create and manage its own advertisement subsidy program or choose to participate in an intermediary's separately managed communication subsidy program 13. In the event of the advertisers choosing an intermediary's communication subsidy program 13, advertisers 10 are required to complete a setup process, receive approval of their profile by the intermediary from a technical and procedural context, and upload their desired ads to be used in the intermediary's communication subsidy program 13 before advertisements may be offered.

In step 20, advertisers 10 connect to or browse the intermediary's website 11. The intermediary's website 11 may reside in a server 12 managed by the intermediary 9. In step 22, advertisers 10 complete an advertiser profile on the intermediary's website 11 identifying the advertisers' criteria. In step 24, advertisers 10 setup a subscriber profile on the intermediary's website 11 identifying necessary demographic criteria of a desirable subscriber 1.

In step 26, advertisers 10 set up a subsidy program. The subsidy program 13 enables advertisers 10 to select or endorse desirable subscribers in order to subsidize the communication fees, offer its own product discounts or other company's product discounts, generate and accumulate "rewards points" for the subscribers, and mitigate or defer other expenses of the subscriber 1. The advertisers 10 may provide other types of subsidies or incentives to the subscribers 1 without departing the spirit and scope of the present disclosure. The selection of subscribers may be based on a matching of the subscribers' criteria against the advertisers' criteria.

In addition, the subsidy program 13 enables advertisers 10 to identify what level of discounts, credits, points, or offerings the subscriber 1 receives as a subsidy in accordance with certain performance criteria. An example of performance criteria includes the number of communication transmissions the subscriber had made and the length of the transmissions. Furthermore, the identification process may be accomplished through a bidding process, an automated auction, or may be standardized based upon other categorical groupings. An example of the bidding process includes a number of advertisers bidding for a group of premium subscribers, who communicate with other subscribers most frequently. An example of categorical groupings includes allowing the subscriber to be endorsed by a different advertiser for each communication event based on a target subsidy or a target destination.

In step 28, advertisers 10 upload their advertisements, which may be in a form of text, audio, video, static graphic, or other advertising media, to the intermediary's website 11 to be later associated with one or more subscriber's communications. Advertisers 10 also have the ability to identify when and how to apply each advertisement media type based upon a set of rules or logic defined by either the advertisers 10 themselves or the intermediary 9.

In step 30, the intermediary 9 confirms with advertisers 10 that the subsidy advertisements are ready for use and that the subsidy program setup is complete. Advertisers 10 may then elect, through a secure login process, to endorse themselves in order to test their advertisements and adjust the advertisements as necessary. Otherwise, in step 32, advertisers 10 may activate one or more advertisements for selection by the subscriber 1. Thus, the process is complete.

Figure 3:
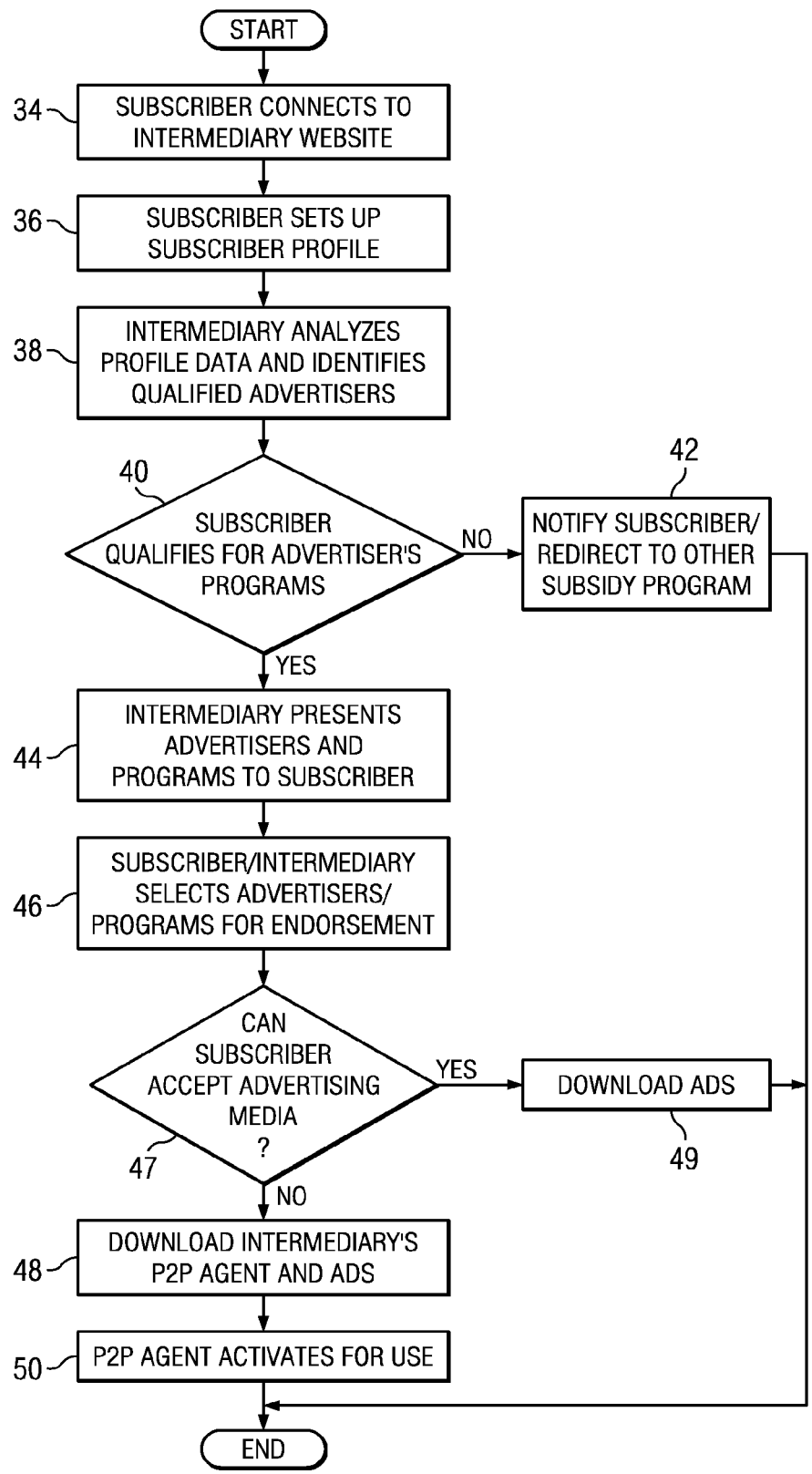
FIG. 3 is a flowchart of an embodiment of a subscriber setup process.

FIG. 3 is a flowchart of an embodiment of a subscriber setup process. To become a subscriber of the intermediary's communication subsidy program 13, in step 34, a source communication device 2 owner or subscriber 1 must first connect to the intermediary website 11. In step 36, the subscriber 1 set up a subscriber profile and qualifies for the subsidy program.

Alternatively, the subscriber 1 may be automatically enrolled in the subsidy program 13 as a result of a relationship with a service provider, such as a cell phone company contract, an existing service provided by an Internet service provider or by other communication service providers, or endorsers such as a product retailer who distributes branded communications devices that are limited to endorsing only their brand through approved subscribers. The subscriber profile includes information regarding the subscriber 1, for example, a name, an address, a device type, a serial number of the device, a phone number of the device, an IP Address of the device, basic demographic information of the subscriber 1, and a carrier calling program. Other characteristics of the service provider's program, such as available minutes and the subscriber's usage history may also be collected.

Once the subscriber's profile is set up, in step 38, the intermediary 9 analyzes the profile data and identifies advertisers 10 whose criteria for subsidy match the subscriber's criteria. For example, advertiser A offers static graphic media and video media and advertiser B offers only audio media. Based on the media type offered, the intermediary 9 qualifies those subscribers whose communication devices have the capability to accept static graphics, video, and/or audio. The intermediary 9 may also require the subscriber 1 to qualify for subsidy over a trial period of time in order to quantify and qualify the calling habits of subscriber 1. For example, the intermediary 9 may examine the usage history of subscribers and qualify only those subscribers who are communicating with others most frequently.

In step 40, a determination is then made by the intermediary 9 as to whether the subscriber qualifies for an advertiser's program. In step 42, if the subscriber 1 does not qualify, the subscriber 1 is notified that the subsidy setup process may not continue, and the process terminates. Alternatively, the subscriber 1 may be redirected to another subsidy program or given information on how to qualify in the future.

In step 44, if the subscriber 1 qualifies, the intermediary 9 presents all acceptable advertisers 10 and subsidy programs available, including the criteria for continued subsidy and levels of subsidy, to the subscriber 1. In step 46, the subscriber 1 or the intermediary 9 may select one or more advertisers 10 and/or subsidy programs containing multiple advertisers or advertisements for endorsement. The subsidy program 13 may include other random or targeted advertisement that the subscriber fails to select.

In step 47, a determination is made by the intermediary 9 as to whether the subscriber 1 has the capability to accept the advertisements for endorsement. In step 49, if the subscriber has the capability to accept the advertisements, the advertisements are downloaded to the subscriber 1. In step 48, if the subscriber 1 does not have the capability to accept the advertisements, an intermediary's endorsement manger software 14 is downloaded to the subscriber's source communication device 2 followed by the advertiser's ads. The endorsement manager software 14 manages advertisements, formats communication transmissions with the advertisements, and records advertising impression history of the advertisement transmissions periodically. In step 50, once the endorsement manger software 14 and advertiser's advertisements are downloaded, the endorsement manger software 14 communicates securely with the intermediary's host system and activates itself for use.

Figure 4:
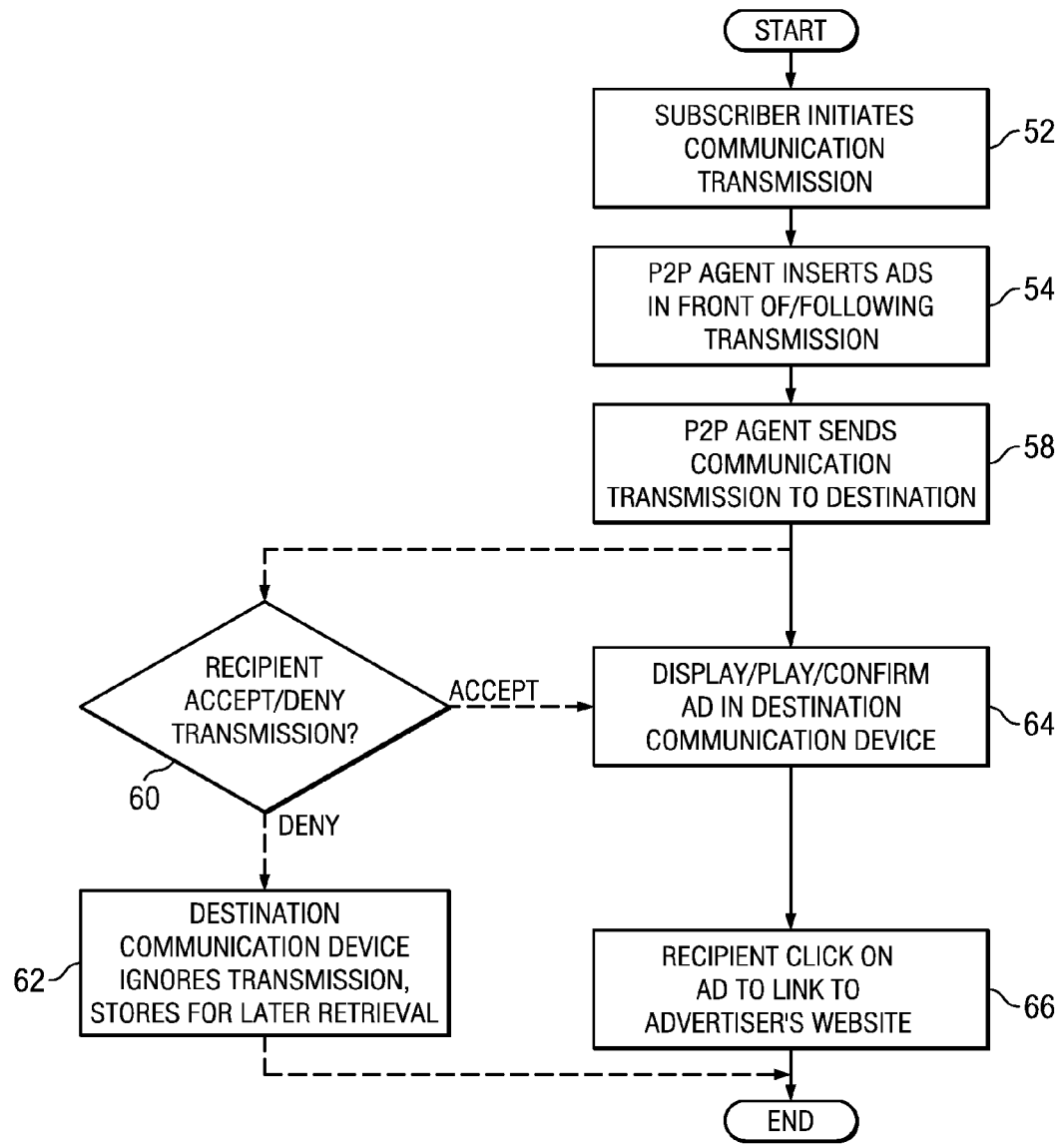
FIG. 4 is a flowchart of an embodiment of a communication process.

FIG. 4 is a flowchart of an embodiment of a communication process. The communication process begins, in step 52, when a communication transmission is initiated by a subscriber 1. A communication transmission may include a cellular phone call, an instant message, a page, or a video conferencing session, and may be initiated using any source communication device 2. In step 54, the endorsement manger software 14 formats the transmission by inserting the appropriate advertiser's advertisement preceding and/or following the transmission. During the communication session, the endorsement manager software 14 records the impression status based on whether the advertisement was displayed, played, or confirmed on the destination communication device 7.

In step 58, once the transmission is formatted, the endorsement manager software 14 sends the communication transmission to the communication destination 8. In step 64, when the communication transmission reaches the destination communication device 7, the advertisement is displayed, played, or confirmed in the destination communication device 7. In step 66, at the end of the communication session, the recipient may click on the advertisement to link, via the Internet, to the advertiser's or another designated website for additional information or further action. The link may direct the recipient to other offers, such as coupons, special offers that are unique to subscriber, or other related parties of the service. In addition to directing the recipient to other offers, advertisers 10 may transmit their own messages to the recipient any time during or after the communication process.

Optionally, in step 60, when the communication transmission is initially received by the destination communication device 7, a determination is made by a recipient of the destination communication device 7 as to whether to accept or deny the transmission. In step 62, if a transmission is denied, the transmission is selectively ignored, and is stored in a voice mail or similar system for later retrieval. In step 64, if the transmission is accepted or is retrieved from voice mail or other storage system, the advertisement is displayed, played, or confirmed in the destination communication device 7. The advertisement may be played, displayed or confirmed followed by, at the same time, or throughout the communication session. In step 66, at the end of the communication session, the recipient may click on the advertisement to link, via the Internet, to the advertiser's or another designated website for additional information. The process then terminates.

Figure 5:
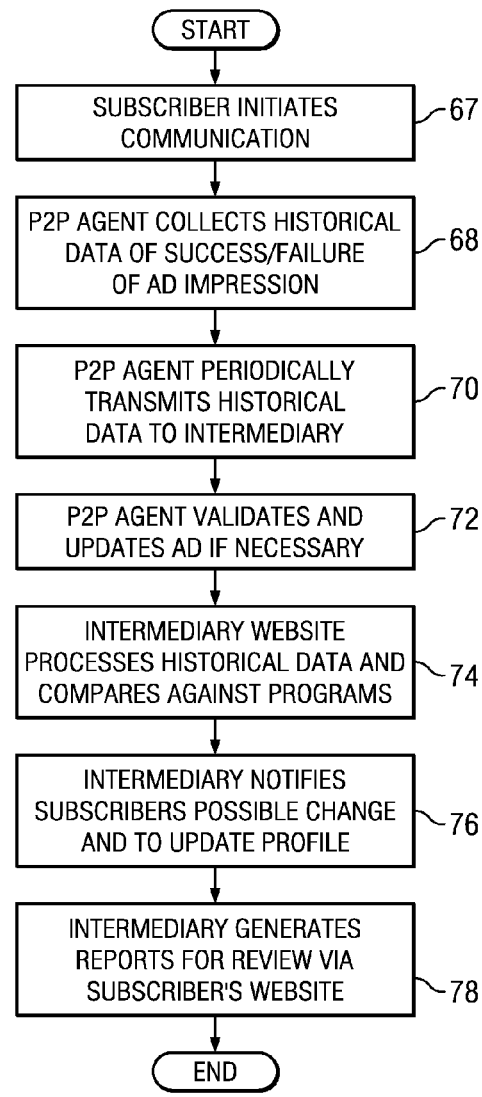
FIG. 5 is a flowchart of an embodiment of a subscription maintenance process.

FIG. 5 is a flowchart of an embodiment of a subscription maintenance process. Subscription maintenance includes collecting regular advertising impression data from the endorsement management software of the subscribers, periodic processing of the impression data against subsidy plans to facilitate distribution of subsidy amounts, changes to the subscriber's profiles, or program eligibility.

The process begins, in step 67, when a communication transmission is initiated by the subscriber 1. In step 68, the endorsement manager software 14 collects historical data from the subscriber, including successes and failures of advertising impression events. Examples of advertising impression events include the number of advertising impressions, the number of advertising media types that have reached and been accepted by the destination communication, the number of advertising impressions for a certain party, and the like. In step 70, the endorsement manager software 14 transmits this historical data to the intermediary's data warehouse for further processing. In step 72, the endorsement manager software automatically validates and updates current versions of advertiser's advertisements, and the endorsement manager software 14 updates itself, if necessary. The intermediary 9 may also periodically update the advertisements as the endorsement manager software 14 is busy communicating with the intermediary's data warehouse to "check in".

In step 74, upon receipt of the historical data, the intermediary website 11 processes the received historical data and compares the data against the subsidy programs for which they have qualified in step 40 in order to generate the subsidy amount for distribution. The subsidy amount may be in a form of discounts or other incentives. In step 76, if the intermediary 9 detects that the subsidy amount of a program is likely to change, the intermediary 9 sends a message to the subscriber 1 informing the subscriber 1 of a possible change or a need to update the subscriber profile. In step 78, the intermediary 9 generates reports to advertisers, service providers, and subscribers for review via the intermediary's website 11. Based on these reports, advertisers and subscribers may readjust their profile.

The system and method described above enables advertisers 10 to reach targeted audiences via mobile communications devices. The recipient of a communication transmission accepts the communication session initiated by a source communication device 2, because the session is identified as being initiated by a trusted or known entity. Upon acceptance, the advertising media is played or displayed to the recipient. The subscribers are given incentives to participate in this program, such as subsidies to their communication fees and/or other compelling incentives.

Other scenarios include communication sessions in which the subscriber 1 is a recipient of the communication session initiated by a non-subscriber. In this case, the endorsement manager software 14 in the destination communication device 7 may insert the advertising media into the communication session prior to enabling the communication between the subscriber 1 and the non-subscriber. The advertising media is played or displayed to the subscriber 1, who is credited to receive incentives based on this communication session.

Figure 6:
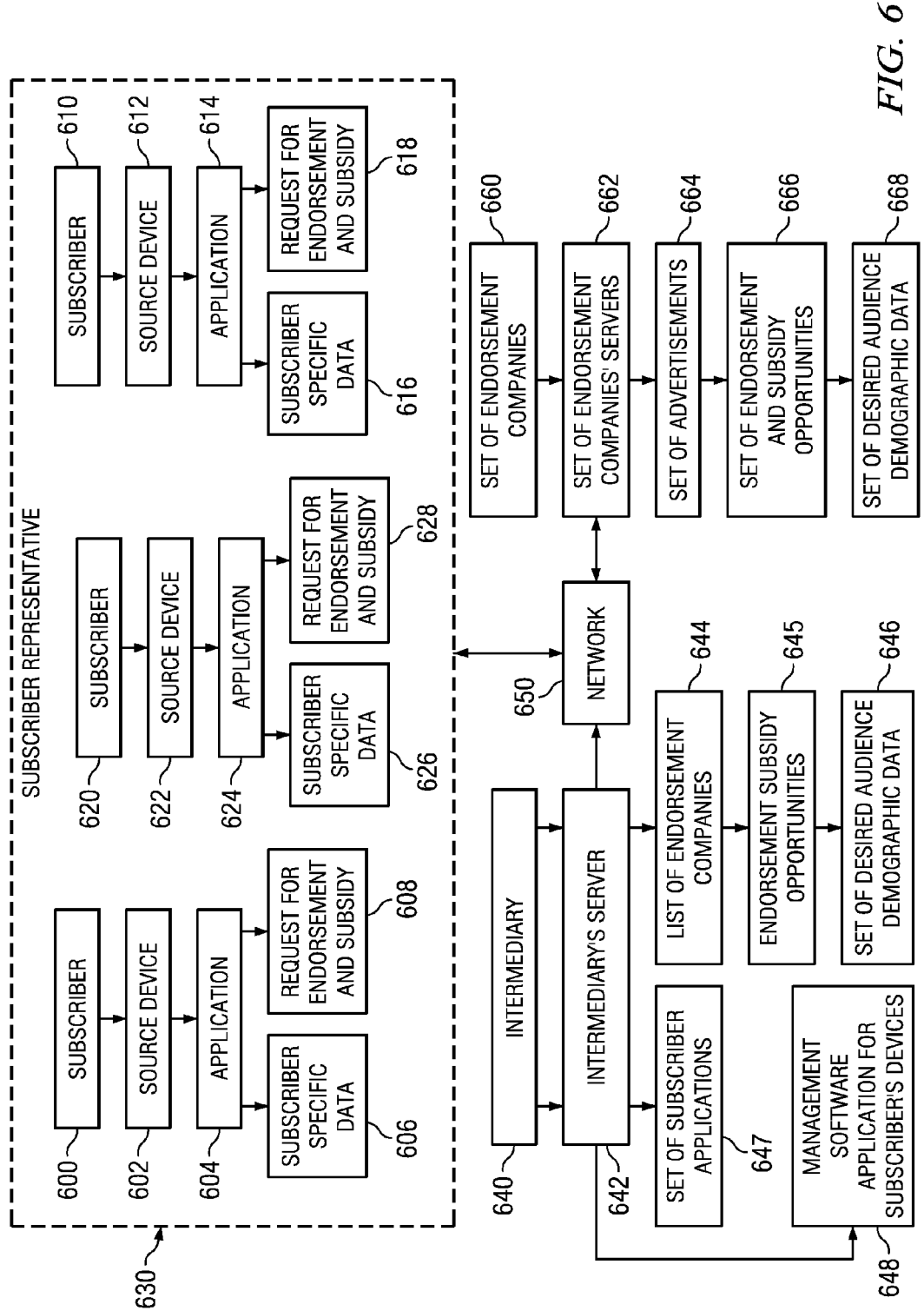
FIG. 6 is a diagram showing communication between the subscriber, intermediary, and the endorsement companies.

FIG. 6 is a diagram showing communication between the subscriber, intermediary, and the endorsement companies (advertisers). The set of subscribers 600, 610 and 620 possess source devices 602, 612 and 622. Subscribers 600, 610 and 620 communicate in a similar manner and will be described using subscriber 600 as an example.

Subscriber 600 creates application 604. Application 604 consists of a request for endorsement and subsidy 608, as well as subscriber specific data 606. Subscriber specific data 606 is demographic data that relates to the subscriber's education, employment, purchasing habits, interests, hobbies, affiliations or other data used to determine a target market for a product.

An endorsement company selected by the subscriber may provide an endorsement or endorsement tag (i.e. "advertiser recommends subscriber"). Alternatively, the subscriber may offer to endorse the company (i.e. "subscriber recommends advertiser"). The endorsement may include an embedded company logo, color or link to an advertisement of a particular product. The product or advertisement that the link points to is controlled by the advertiser and may be redirected by the intermediary. In the preferred embodiment, the intermediary serves as the hosting site for product or advertising data. In other embodiments, the intermediary and the hosting site may be located at different machines Subscriber 600 communicates with intermediary 640 through source device 602, network 650 and the intermediary's server 642. Subscriber 600 communicates with any of the set of endorsement companies 660 through source device 602, network 650 and set of endorsement companies' servers 662.

Intermediary 640 communicates with network 650 through intermediary's server 642. Additionally, list of endorsement companies 644, set of subscriber applications 647 and software application for subscriber's devices 648 reside on intermediary's server 642.

List of endorsement companies 644 includes endorsement and subsidy opportunities 645 corresponding to specific endorsement companies. The list of endorsement companies 645 includes the nature of a company's products and an estimate of the amount of subsidy that may be provided or the cost to the subscriber for the company's endorsement. Endorsement and subsidy opportunities 645 include a set of desired demographic data 646. Desired demographics 646 relate to a target market that a company is trying to reach with its ad campaign and products.

Set of subscriber applications 647 are applications 604, 614, 624 that have been submitted to the intermediary via network 650 or otherwise entered into the intermediary's server 642.

Endorsement manager software 648 is downloaded to source device 602, 612, 622 via network 650. As described earlier, endorsement manager software 648 allows subscribers 600, 610, 612 to accept and pass endorsements and advertisements.

Set of endorsement companies 660 communicates with network 650 through set of endorsement companies' servers 662. Set of endorsement companies' servers 662 contains set of advertisements 664. Set of endorsement and subsidy opportunities 666 are related to individual advertisements from the set of advertisements 664. The endorsement and subsidy opportunities 666 contain a set of desired audience demographic data 668 which relate to a target market selected by a company.

Figure 7A:
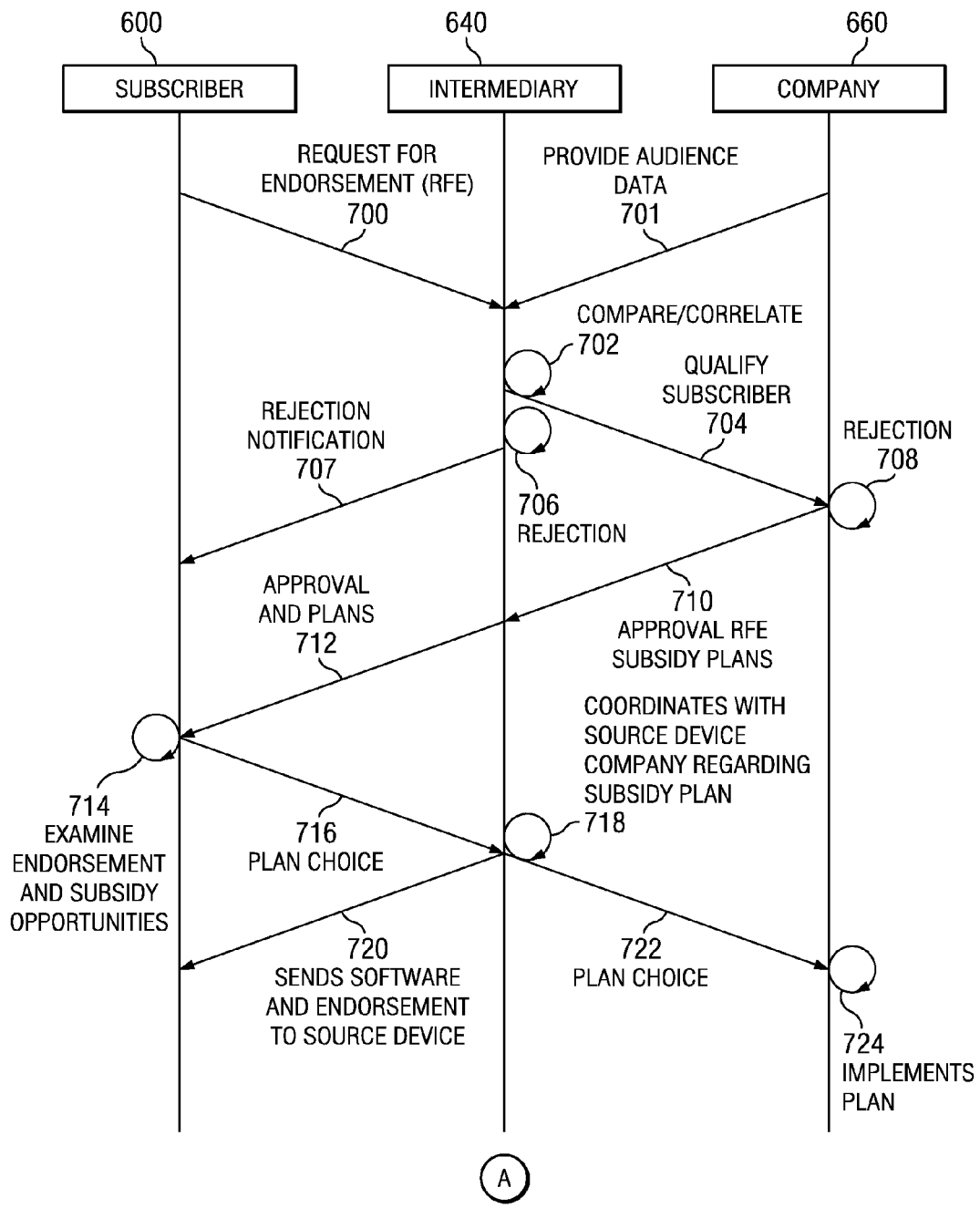
FIG. 7a describes the interactions between the subscriber, intermediary and advertiser nodes during the enrollment process.

FIG. 7a describes the bi-directional endorsement process between the subscriber and the advertiser via the intermediary during the enrollment process. Subscriber 600, intermediary 640 and set of endorsement companies (advertisers) 660 represent "nodes" or "tiers" in a computer network. Each node or tier may represent a communication device and the appropriate computer server and computer network connections to allow communication and passing data between subscriber 600, intermediary 640 and company 660. The nodes may also represent groups of machines in a network confirmation. The nodes do not reflect (nor require) a specific carrier or service provider for the source device.

At step 700, subscriber 600 contacts intermediary 640 through network 650 using source devices 602 and makes a subscription request including a request for endorsement. At this step, subscriber 600 selects one or more potential endorsers from list of endorsement companies 644. Subscriber 600 submits application 604, including the selected endorsement companies and subscriber demographic data, to intermediary 640. At step 701, an advertiser contacts intermediary 640. Advertiser 660 submits one or more sets of desired demographic criteria to intermediary 640.

At step 702, intermediary 640 correlates the subscriber data with the set of demographic data criteria of the advertiser. A correlation value is assigned by intermediary 640.

In the preferred embodiment, the correlation value is calculated as a match value or weighted percentage between the demographic criteria 646 and the subscriber demographic data.

Other correlation routines can be used to provide additional metrics to the subscriber and the advertiser related to the "match" of the subscriber demographic data with the advertiser criteria. For example, a multipoint questionnaire is provided to the subscriber including various categories during the subscription process. Questions include multiple choice questions. Answers to the multiple choice questions and each of the categories are assigned a weight. The combined weight is provided to the advertiser and to the subscriber as a correlation value.

In another embodiment, credit reports of the subscriber from third parties may be implemented to calculate a correlation value. Additionally, financial information related to the subscriber, such as credit history or financial status may be evaluated to arrive at a correlation value. At step 706, potential subscribers who score lower than the required correlation value are recommended for rejection.

Alternatively at step 702, advertiser 660 receives a set of subscriber data from intermediary 640. Advertiser 660 then correlates subscriber specific data 606 with desired audience demographic data 668 to derive a correlation value.

At step 704, a list of potential subscribers that meet a desired correlation value or that offer a sufficient payment by the subscriber for endorsement are forwarded to the appropriate advertiser 660.

Intermediary 640 notifies subscriber 600 of a rejection at step 707. If the subscriber is rejected, the rejection is recorded by the intermediary and the process stops.

At step 708, the advertiser decides whether to endorse a particular subscriber, based on the results of the correlation. The advertiser calculates the amount to subsidize or charge the subscriber for the endorsement. For example, subscriber 600 that achieves a high correlation value may receive a larger subsidy than the subscriber who achieves a low correlation value.

Provisions can be provided to allow the subscriber to purchase an endorsement from the advertiser. For example, a sliding scale may be applied to calculate a price for the subscriber to pay based on a correlation value. A floor function can also be applied below which no endorsement will be provided by the advertiser of the subscriber.

If a sufficient correlation value is achieved or the subscriber purchases an endorsement, the subscriber is deemed a "qualified" subscriber. At step 710, the advertiser notifies intermediary 640 of the endorsement and subsidy opportunities for which the subscriber has been qualified. Intermediary 640 then notifies subscriber 600, at step 712.

At step 714, subscriber 600 must examine the endorsement and subsidy opportunities. At step 716, subscriber 600 chooses at least one plan and advertiser for endorsement and notifies intermediary 640. At this point, bi-lateral endorsement is complete.

At step 718, intermediary 640 interrogates source device 602 regarding its ability to perform the requirements of the endorsement plan. For example, source device 602 may not be capable of sending an endorsement with an embedded link or may not be capable of handling large graphics files.

At step 720, depending on device capabilities, intermediary 640 sends the compressed endorsement manager software and the endorsement selected by subscriber 600 to source device 602 held by subscriber 600. In the preferred embodiment, the endorsement manager is software that manages the endorsement and history related to the endorsement. The endorsement manager software is sent, along with a set of links to various advertisements, endorsement tags and graphics files. The endorsement manager software is then decompressed and installed on the source device.

At step 722, the advertiser is notified of endorsement and subsidy opportunities selected by subscriber 600. The selected opportunities are implemented by the advertiser in step 724.

The bi-directional selection process allows the subscriber to select endorsers that appeal to him. The advertiser then determines if the subscriber is qualified based on a correlation between the subscriber's demographics and those desired by the advertiser. The subscriber's contacts presumably share some, if not all, of the subscriber's demographics and interests. Therefore, the contacts provide a select market and value to the advertiser, while requiring only a single demographic comparison. This allows an advertiser to focus its endorsements on favorable target markets without having to qualify each possible customer or examine demographics of a large number of potentially bad prospects.

Figure 7B:
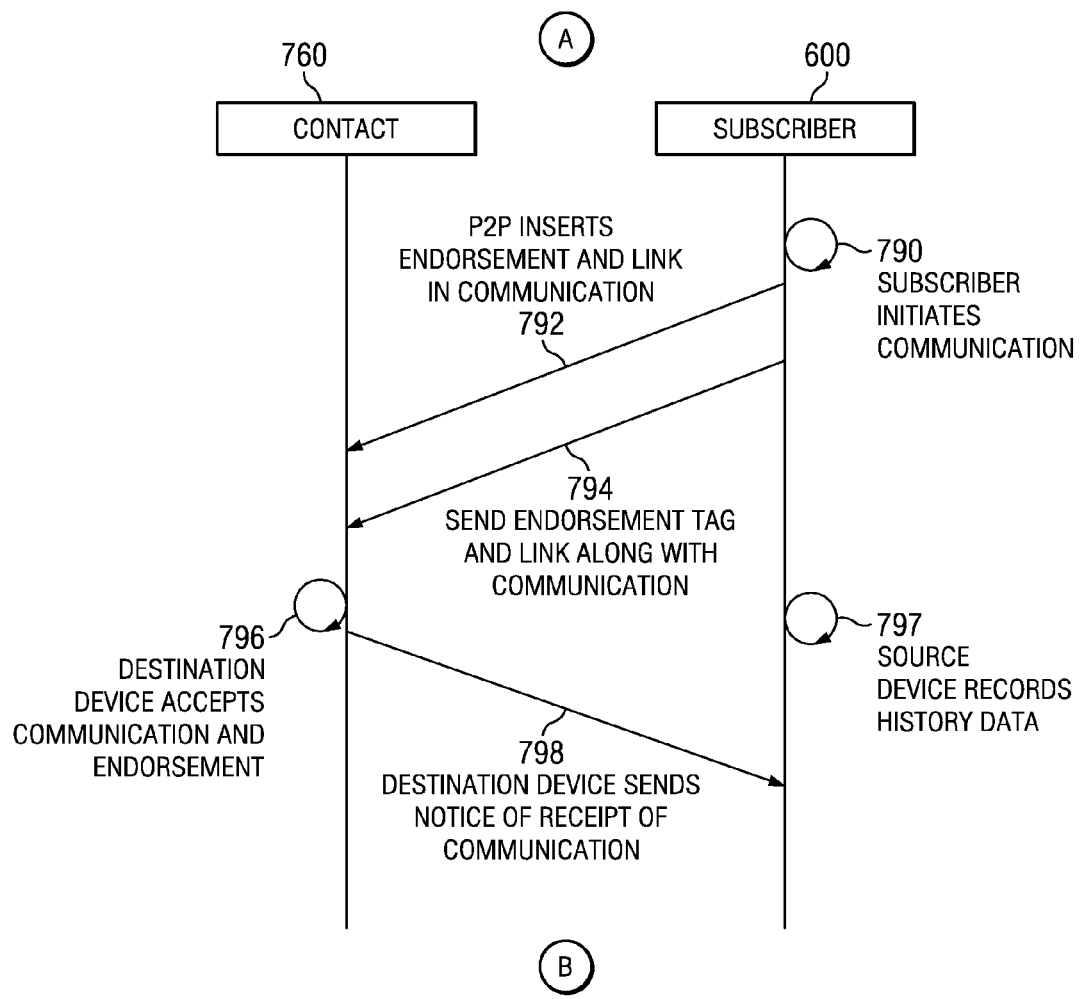
FIG. 7b describes a communication and the recording of historical data.

FIG. 7b describes a communication and the recording of historical data. Subscriber 600 initiates a communication with contact 760 in step 790. At steps 792 and 794, the endorsement manager software inserts and sends an endorsement and embedded link in the communication. The destination device accepts the communication and embedded link and sends a response to the source device in steps 796 and 798. The source device records the historical data in step 797.

FIG. 7c describes the data flow required for subsidy collection. At step 750, the intermediary receives history data from the subscriber 600 reflecting a communication with contact 760, such as a phone can where an imbedded link has been sent in an endorsement message. At step 762, contact 760 follows the link embedded in the endorsement to the advertisement data hosted by intermediary 640. Intermediary 640 monitors historical data including the number of endorsements sent by subscriber 600 and the number of recipients contacted by subscriber 600 that use the embedded link to view the advertisement from the set of advertisements 664. Individual contacts are identified by a unique identifier embedded in each endorsement sent by subscriber 600 to contact 760. At step 766, the unique identifier is decoded by the intermediary site 640, allowing identification of the contact 760 responding to the endorsement. At step 751, the intermediary calculates the subsidy and analyzes the subscriber history data and contact interaction history.

The endorsement and the embedded link may be altered in response to various stimuli. For example, a random function may be provided in the software to change the endorsement and/or embedded link resulting in random changes. In another example, the endorsement and/or embedded link may be changed to reflect a different product of the company at different times of day. Additionally, when the embedded link is activated additional information may be sent from the destination device, such that the geographical location of the destination device is known. Intermediary site 640 may redirect the embedded link to a new advertisement based on geographical, time, data or previous responses by the destination device. Intermediary site 640 determines the geographical location of the device by determining which cellular tower is carrying the response from the destination device or by information supplied by the destination device, such as GPS coordinates. The endorsement and embedded link can also be configured to respond to specialized applications or "apps" resident on the source device to reflect changing conditions dictated by the app. For example, an application maybe capable of reflecting ringtone changes and/or music preference changes. In these applications listening habits and cell phone configurations for various lighting displays can supply information to trigger predetermined variations in the endorsement or embedded link.

For example, if the embedded link were to a national restaurant chain, intermediary site 640 may redirect it to an advertisement for the nearest restaurant. Intermediary site 640 may contain the hours of operation of the restaurants and direct the link to an advertisement for the nearest open restaurant. If no restaurants are open within a predetermined range, intermediary site 640 may select an alternative advertisement. Intermediary site 640 may also store data regarding previous interaction from the destination device and redirect the link accordingly. For example, a savings offer may be limited to one per device, such that intermediary site 640 redirects the destination device to a different link if an offer has been previously accepted. Alternately, a source device may receive additional benefits, such as coupons, for frequently following the link embedded within an endorsement.

Figure 9:
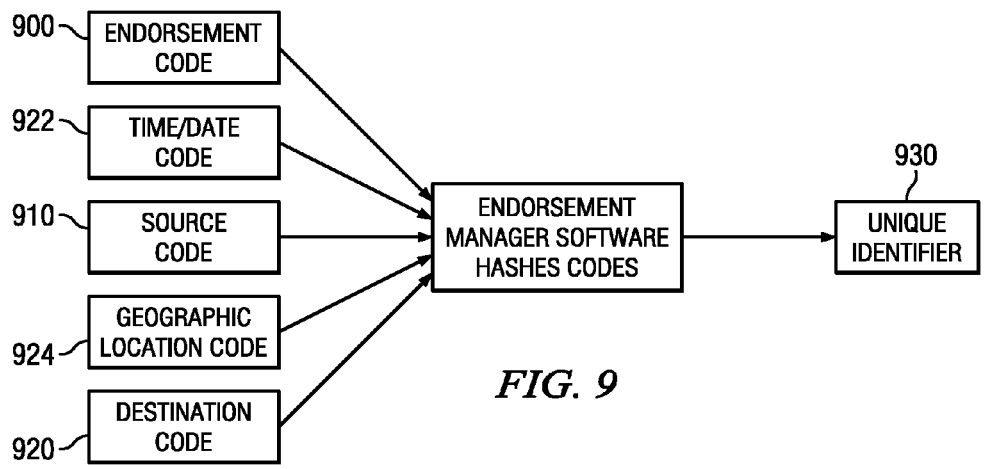
FIG. 9 describes the creation of a unique identifier for each endorsement sent by the subscriber to a contact.

Referring briefly to FIG. 9, in an alternate embodiment, historical data regarding interaction of contact 760 with the embedded link may be stored on the source device as previously described. Alternatively, the endorsement sent to the contact from the source device contains a hash of three separate codes. Endorsement code 900 identifies the endorsement sent to the contact. Source code 910 identifies the source device that sent the endorsement. Contact code 920 identifies the contact that received the message. The endorsement manager software residing on the source device creates a unique identifier 930 for each endorsement sent and includes the unique identifier 930 in the link embedded in the endorsement. The unique identifier 930 is created by combining several separate codes together in any one of many encryption routines (known in the art as "hashing") to form a code that is unique for each endorsement sent by a subscriber. Source code 910 and contact code 920 may be created based on device serial number, phone number or other numbers unique to the device. Other codes, including the date code 922 and geographic location 924 of the source device may be combined as well to create unique identifier 930. Endorsement code 900 is included in the endorsement when it is downloaded by the subscriber.

In other embodiments, the identity of the contacts, the duration of the message and communication, the scheduling of advertisements to view and the length of time that the contacts browser is focused on the advertisement are recorded. Additional information collected can include links navigated to, before and after, viewing the advertisement can be recorded. In certain cases, identification of contacts recognized by the recipient can be logged. Purchase and payment information may be collected. Identification of music files, licenses and picture files may be collected. Call log information may be collected. Data reflecting prior approval as a qualified subscriber, and use of the system by the recipient may also be collected. Data reflecting network information such as packet count and packet size may be collected. Data reflecting location information via a GPS transponder may be collected. The analysis may include grouping data with other similar data from other subscribers to develop buying trends, demographic profiles and purchase information. Analysis of customer location and dwell times at various websites and "brick and mortar" stores may be analyzed. A fee may be calculated and assessed by the intermediary at step 751.

Continuing with FIG. 7c, at step 726, a report, showing the analysis and subsidy due, is sent to the advertiser by intermediary 640. At step 728, the advertiser may verify the calculations of the intermediary submitted in the report or modify the subsidy recommended. At step 729, advertiser 660 may request additional information and analysis from the intermediary. In-turn, the intermediary supplies additional reports via step 726. At step 730, the calculated subsidy is implemented. This may be a payment to a subscriber 600, or transmission of a bill owed by subscriber 600 for use of the endorsement to the subscriber. Of course, other means of implementing a subsidy, such as electronic funds transfer or generation of prepaid credit cards or vouchers may also be employed. Payment to the intermediary is made by the advertiser at step 731.

Referring again to FIG. 7a, in an alternate embodiment, subscriber 600 includes a first minimum amount he is willing to accept for the endorsement of a particular advertiser in with the request for endorsement at step 700. A second (larger) minimum amount is relayed to the company at step 704. If the company agrees to the second minimum amount in step 710, subscriber 600 is immediately enrolled in the selected endorsement and subsidy opportunities 645. This embodiment bypasses steps 712 and 716. The minimum first amount subscriber 600 is willing to accept is (typically) not provided to the advertiser by intermediary 640. The difference between the first minimum amount and the second minimum amount is retained by intermediary 640 as payment for its services.

Returning to FIG. 6, in an additional alternative embodiment, a subscriber representative 630 may assume a proxy arrangement for subscribers 600, 610 and 620. In a proxy arrangement subscriber representative 630 acts on behalf of a group of subscribers that share similar demographic features. A proxy arrangement can be organized to reduce the cost of using the system by individual subscribers by pooling and offering endorsements through all the subscribers source devices 602, 612, 622 that are included in the proxy. In this instance, an endorsement may be changed to also include an endorsement by the subscriber representative In another embodiment, an advertiser offers additional subsidies or bids against another advertiser for preferred treatment. This preferred treatment includes more frequent insertion of one advertiser's endorsements over any others, particular days or time of day for endorsements, particular geographic locations, and endorsements sent to particular contacts of the subscriber. For example, an advertiser may endorse subscribers who are fans of a particular sport immediately before, during or after a particular game. Also, an advertiser may endorse a subscriber who calls a contact that has responded to a message in the past. A contact who has responded in the past may be identified by a phone number, an IP address or similar information that is transferred when the contact responds to the endorsement.

Figure 8:
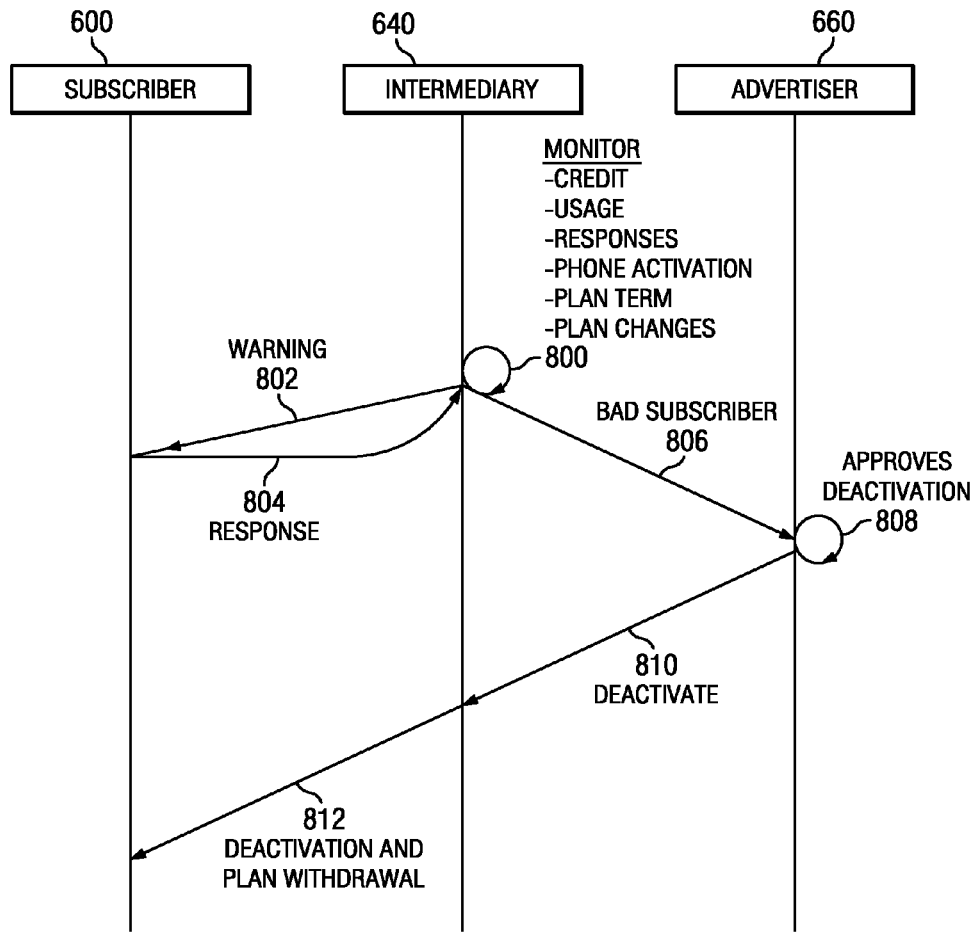
FIG. 8 describes interactions between the subscriber, intermediary and advertiser nodes during the subscriber de-enrollment process.

FIG. 8 describes the de-enrollment process. At step 800, intermediary 640 monitors various aspects of subscriber 600 and source device 602. Among other things, intermediary 640 may monitor credit history, source device usage, device activation, responses from contacts and expiration of or changes to the current endorsement plan. At step 802, intermediary 640 warns subscriber 600 of a status change that could result in a change to the endorsement plan. Subscriber 600 responds to the warning at step 804. At step 806, the intermediary notifies advertiser 660 that subscriber 600 may no longer qualify for the current endorsement plan.

At step 808, advertiser 660 determines if subscriber 600 is still a qualified subscriber. Alternatively, advertiser 660 may decide to allow subscriber 600 time to cure any deficiencies in qualified subscriber status while allowing subscriber 600 to remain on the endorsement plan.

At step 810, advertiser 660 sends a deactivation notice to intermediary 640. At step 812, intermediary 640 then deactivates subscriber 600 and removes source device 602 from the endorsement plan.

An embodiment of the present disclosure can take the form of an entirely hardware embodiment, an entirely software embodiment, or an embodiment containing both hardware and software elements. For example, one of the previously described embodiments may be implemented in software, which includes but is not limited to firmware, resident software, microcode, etc. In addition, various steps of the above processes may be performed in another order, split into additional steps, or combined into a single step. Steps may also be removed and or added to any of the above processes.

Furthermore, the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disc (DVD).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. A method for providing access to an advertisement from an advertiser to a source communication device possessed by a subscriber and distributing the access to the advertisement from the source communication device to a destination communication device possessed by a recipient, wherein the destination communication device is compatible with the source communication device, and the recipient having a relationship to the subscriber, the method being executed by a processor, and comprising the steps of:

comparing a desired demographic profile to a subscriber demographic profile to derive a match;

establishing a bi-lateral endorsement between the subscriber and the advertiser;

providing a subsidy program to the subscriber based on the match;

sending a token related to the advertisement to the source communication device;

sending, to the source communication device, information that can be used to initiate a communication session between the source communication device and the destination communication device and to transmit a message, including the token, from the source communication device to the destination communication device contemporaneously with the communication session; and, recognizing a subsidy, according to the subsidy program, for the subscriber after a termination of the communication session.

2. The method of claim 1, wherein the step of sending information further comprises the step of transmitting the token from the source communication device to the destination communication device.

3. The method of claim 1, wherein the step of comparing the desired demographic profile further comprises the step of creating the demographic profile according to a set of advertiser criteria.

4. The method of claim 1, wherein the step of providing a subsidy program further comprises the step of relating the subsidy to one of the group of a product discount, a reward, and a mitigation of expenses.

5. The method of claim 1, wherein the step of recognizing a subsidy includes the further step of basing the subsidy on an acknowledgement by the destination communication device of the receipt of the token.

* * * * *

UNITED STATES PATENT AND TRADEMARK OFFICE
CERTIFICATE OF CORRECTION

PATENT NO.         : 8,457,670 B2                                 Page 1 of 1
APPLICATION NO.    : 13/423048
DATED              : June 4, 2013
INVENTOR(S)        : Andrew E. Levi and Bradley W. Bauer It is certified that error appears in the above-identified patent and that said Letters Patent is hereby corrected as shown below:

Title Page:

Item (63)
Change "Continuation of application No. 12/592,019, filed on Nov. 18, 2009, now Pat. No. 8,155,679, which is a continuation of application No. 11/318,144, filed on Dec. 23, 2005, now Pat. No. 7,664,516."

to

--Continuation of application No. 12/592,019, filed on Nov. 18, 2009, now Pat. No. 8,155,679, which is a continuation-in-part of application No. 11/318,144, filed on Dec. 23, 2005, now Pat. No. 7,664,516.--

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,457,670 B2 | Page 1 of 1 |
| APPLICATION NO. | : 13/423048 | |
| DATED | : June 4, 2013 | |
| INVENTOR(S) | : Levi et al. | |

It is certified that error appears in the above-identified patent and that said Letters Patent is hereby corrected as shown below:

On the title page in Item (73) change "Blue Calypso" to --Blue Calypso, LLC--

Signed and Sealed this
Seventeenth Day of February, 2015

Michelle K. Lee
*Deputy Director of the United States Patent and Trademark Office*